(12) United States Patent
Rohmer

(10) Patent No.: US 7,531,744 B1
(45) Date of Patent: May 12, 2009

(54) CEILING BOX

(75) Inventor: Richard M. Rohmer, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/848,713

(22) Filed: Aug. 31, 2007

(51) Int. Cl.
*H01H 9/02* (2006.01)
(52) U.S. Cl. ............................ 174/58; 174/61; 174/54; 174/63; 248/906; 439/535
(58) Field of Classification Search ................ 174/58, 174/61, 54, 63; 220/3.3, 3.9, 3.92, 3.54; 248/906; 439/535
See application file for complete search history.

(56) References Cited

U.S. PATENT DOCUMENTS

| 4,399,922 | A | | 8/1983 | Horsley | |
|---|---|---|---|---|---|
| 4,483,453 | A | * | 11/1984 | Smolik ...................... | 220/3.5 |
| 5,234,119 | A | | 8/1993 | Jorgensen et al. | |
| 5,762,223 | A | | 6/1998 | Kerr, Jr. | |
| 6,107,568 | A | | 8/2000 | Schnell et al. | |
| 6,323,424 | B1 | * | 11/2001 | He .............................. | 174/58 |
| 6,509,524 | B1 | | 1/2003 | Gretz | |
| 6,646,201 | B1 | | 11/2003 | Gretz | |
| 6,677,523 | B1 | | 1/2004 | Gretz | |
| 6,768,071 | B1 | * | 7/2004 | Gretz ........................ | 200/297 |
| 6,827,229 | B2 | | 12/2004 | Dinh et al. | |
| 6,924,431 | B1 | | 8/2005 | Ofcharsky et al. | |
| 7,009,110 | B1 | | 3/2006 | Gretz | |

* cited by examiner

*Primary Examiner*—Dhiru R Patel
(74) *Attorney, Agent, or Firm*—Daniel P. Malley; Bond, Schoeneck & King, PLLC

(57) ABSTRACT

The present invention is directed to an electrical wiring box that includes a wiring device interface portion having a substantially planar member configured to accommodate a structural member on a first side and a rim portion extending from a perimeter of the planar member from a second side thereof to form an enclosed volume. The rim portion has a rim width approximately equal to a width of a sheet of drywall. The wiring device interface portion also includes a plurality of fastener apertures. A fastener storage structure includes a plurality of fastener storage holders extending in a direction substantially perpendicular to the first side of the planar member. The fastener storage holders and the planar member are configured to accommodate the structural member therebetween. Each fastener storage holder includes a fastener holder opening accessible from the second side. Each fastener storage holder is configured to secure a corresponding one of a plurality of fasteners within such that an end portion of a fastener disposed therein does not substantially extend into the volume. A wiring storage box includes a wall surface connected to the fastener storage structure at a first end and not connected to the fastener storage structure at a second end. The wiring storage box includes a sidewall extending contiguously from the rim portion and connected to the wall surface to form an interior wiring storage volume. The wiring storage box also has a wiring ingress portion.

25 Claims, 7 Drawing Sheets

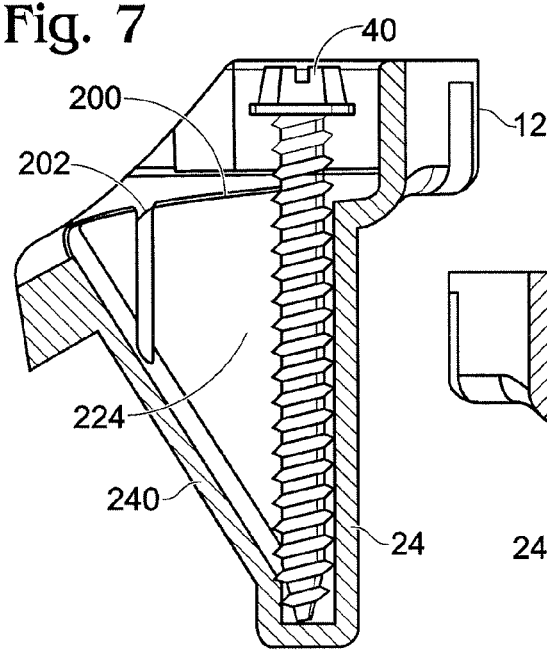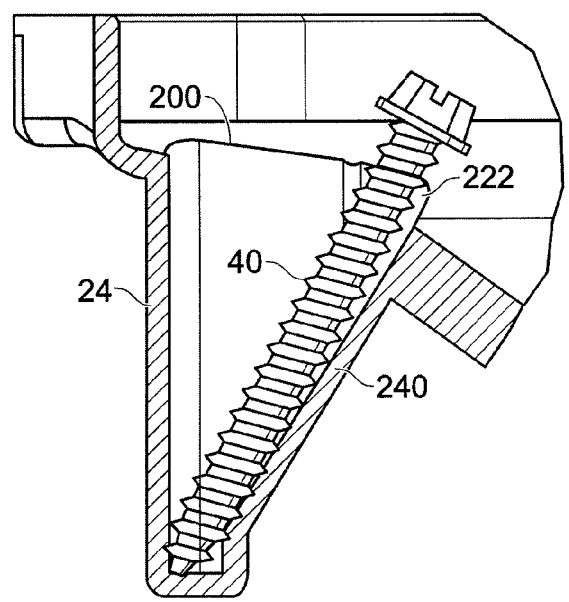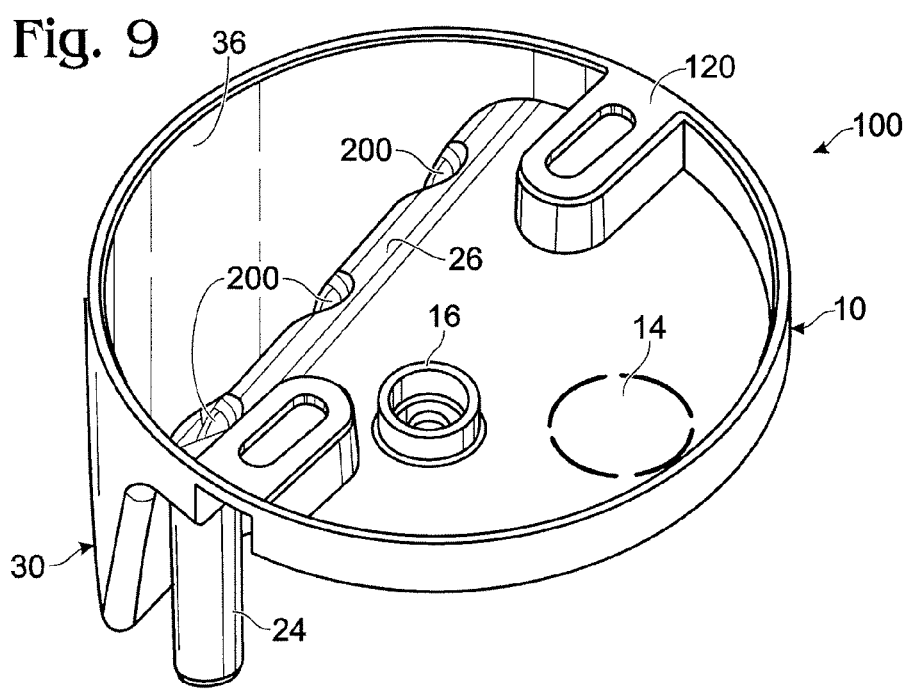

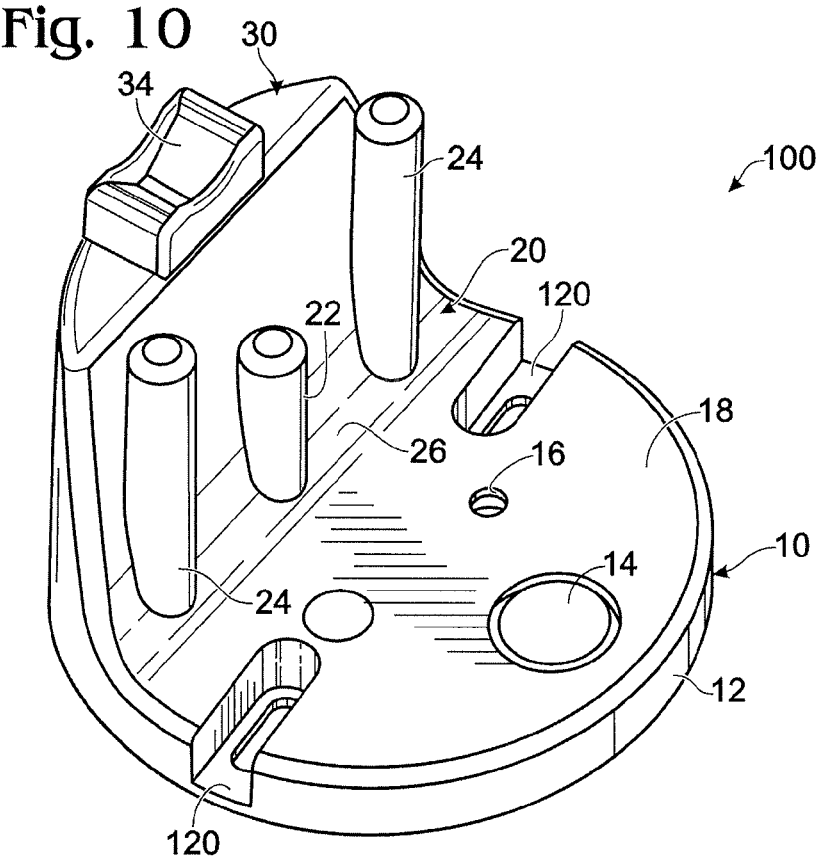
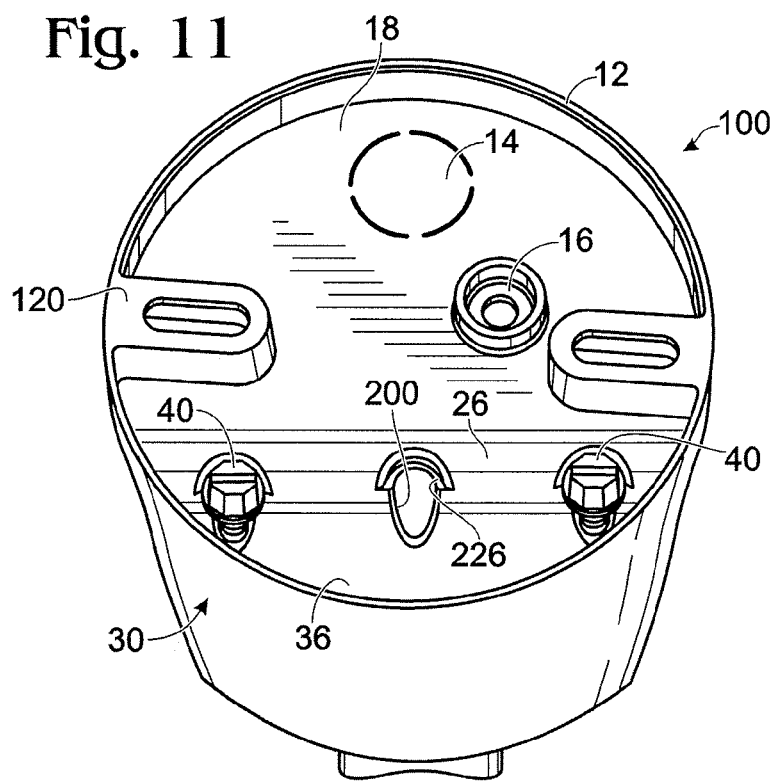

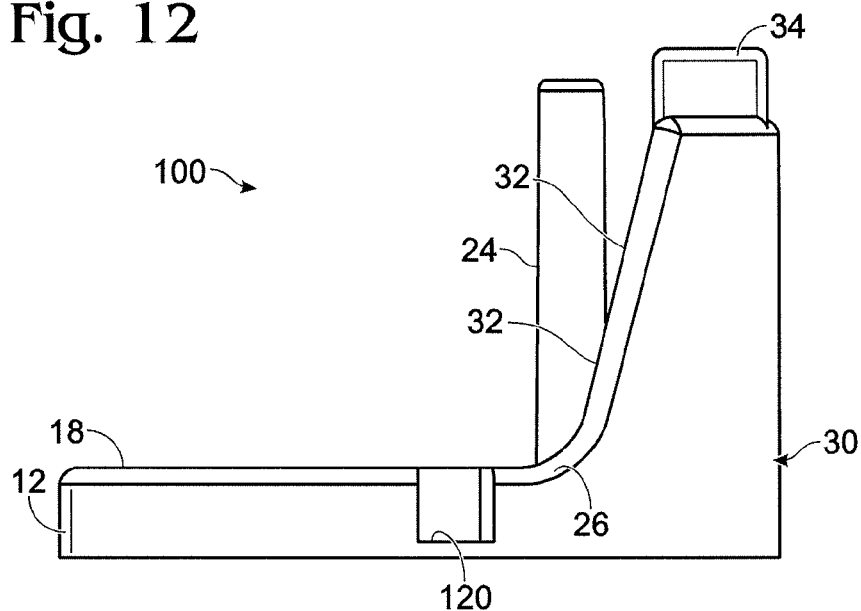
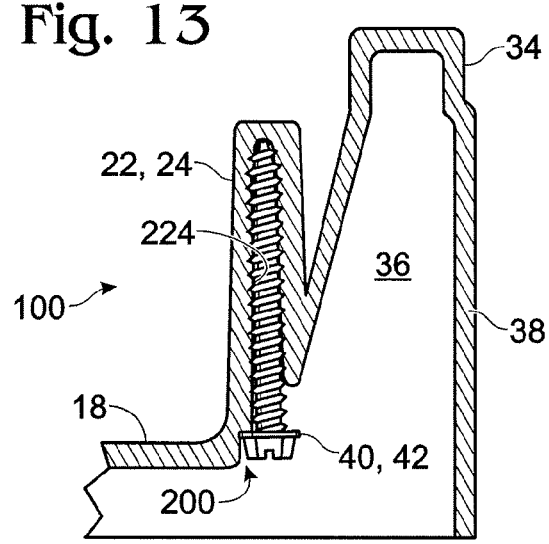
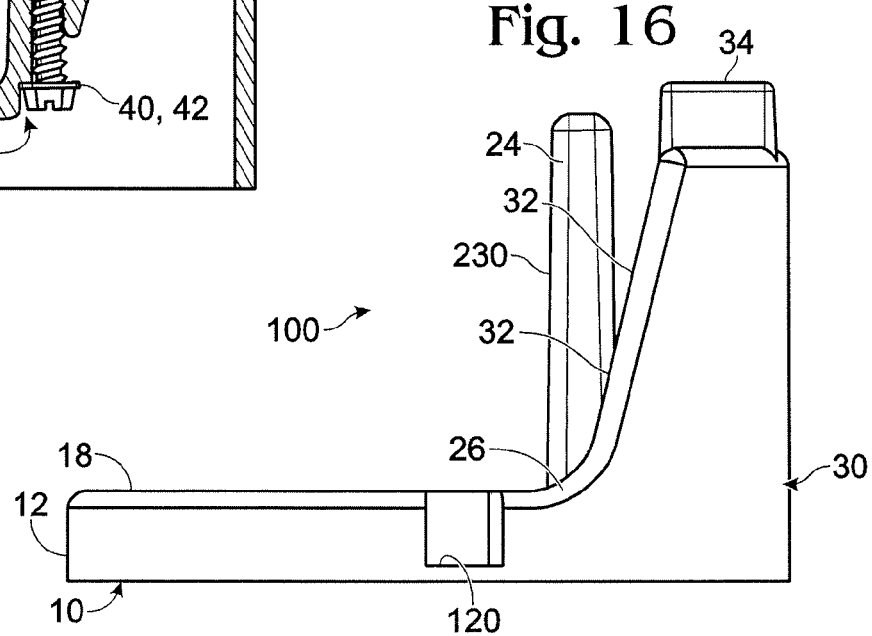

CEILING BOX

BACKGROUND OF THE INVENTION

1. Field of the Invention

The present invention relates generally to electrical wiring enclosures, and particularly to electrical wiring boxes suitable for use with ceiling fans.

2. Technical Background

Electrical boxes are used to mount electrical wiring devices of various types, usually with the electrical wiring and connectors enclosed therein. For example, electrical boxes are often used to mount and secure lighting fixtures. As those of ordinary skill in the art will understand, one type of electrical box is known as a ceiling box. As the name suggests, a ceiling box is typically fixed to a truss, joist or other such structural support member and accommodates lighting fixtures, fans, etc. that extend from the ceiling.

Related art ceiling boxes may be formed using metallic materials or, more frequently, from resinous plastic materials, which are relatively inexpensive. The strength and stability of a ceiling box is not an issue when the lighting fixture is for a simple overhead light bulb. However, the loads have increased over the years as ceiling fans, chandeliers and/or other relatively ornate lighting fixtures became more common place. Ceiling fans may be problematic, from a static loading point of view, because they typically include a relatively large and heavy motor. Of course, many ceiling fans are also equipped with lighting fixtures, further exacerbating the static loading issue. In addition, ceiling fans also raise dynamic loading considerations. Dynamic loading comes into play by virtue of the rotation of the fan. What is needed, therefore, is a ceiling fan box having the structural strength and stability to accommodate the relatively large static and dynamic loads represented by lighting fixtures and ceiling fans currently being employed in the construction industries.

Assuming that the ceiling box has adequate strength and stability, another issue that often comes into play relates to the installation process itself. After the rough-in phase of construction, for example, the related art ceiling box is mounted to the ceiling joist by inserting a fastener into an aperture disposed therein. Related art boxes typically include a lead box for storing the fasteners. Once the ceiling box is mounted, electrical wiring must be inserted through an opening in the lead box. In many cases, the installer removes the fasteners from the lead box and sets them aside because they inhibit the process of pulling the wiring down through the opening and into the lead box. After the process is completed, the exposed wiring is stuffed back into the lead box for storage and a tradesperson places sheetrock over the partially installed ceiling box. Unfortunately, the fasteners that came with the ceiling box are often misplaced and lost.

After sheetrock installation is completed, a tradesperson uses a roto-zip tool to cut away the portion of the sheet rock that is covering the ceiling box. After the dry-wall is finished and painted, an installer returns to the site to finish the installation of the ceiling fan. At this point, the whereabouts of the proper fasteners required to finish the task is unknown. The installer is forced to find properly sized fasteners to complete the job. What is needed is an electrical box that includes prepackaged fasteners to simplify the installation task.

In one approach that has been considered, an electrical box is sold with a fastener holder, such as a flexible plastic bag with fixture mounting screws temporarily secured therein. In practice, a box mounting screw is inserted completely through the plastic bag to temporarily secure the electrical box and plastic bag to the joist. The fixture mounting screws can then be removed from the plastic bag and can be used to further fix the electrical box and fixture to the joist. However, this approach has drawbacks. During the "roto-zip" portion of the installation process, the tool may strike the holding bag, causing the contents to spill out when the sheet rock is removed.

In a similar approach, the electrical box includes integrally formed fastener towers that extend from the box itself. These towers typically hold the fasteners in by way of friction fit. Unfortunately, this approach has disadvantages that are similar to the drawback referred to above. These projections are often hit by the roto-zip tool, damaging either the tool, the fastener tower, or both.

In yet another approach that has been considered, the box manufacturer supplies the fixture mounting screws in a separate container. Of course, this approach does not solve the problems previously articulated because the container itself may become separated from the ceiling box during one of the stages of installation. Furthermore, the fastener container represents an additional item that must be manufactured, increasing costs. Ultimately, the fastener container will be thrown into the trash after usage. In a word, the use of a separate container is wasteful.

What is needed, therefore, is a ceiling box that includes a means for storing fasteners within the box itself during the various stages of installation. What is needed is an intermediate portion of the box, separate from the wiring storage area, to thereby eliminate the drawbacks associated with related art boxes. The intermediate storage area should secure the fasteners therein such that they cannot be accidentally separated from the ceiling box and, at the same time, be easily removed when needed.

SUMMARY OF THE INVENTION

The present invention addresses the needs described above by providing a ceiling box that includes a storage area that accommodates fasteners within the ceiling box during each stage of installation. The storage area is an intermediate portion of the box, separate from the wiring storage area and the mounting area. The intermediate fastener storage area does not interfere with wiring installation or the roto-zip phases of installation. The intermediate storage area of the present invention secures the fasteners therein such that they cannot be accidentally separated from the ceiling box and, at the same time, be easily removed when needed. The intermediate storage area of the present invention also abuts the joist to provide additional mounting stability.

One aspect of the present invention is directed to an electrical wiring box that includes a wiring device interface portion having a substantially planar member configured to accommodate a structural member on a first side and a rim portion extending from a perimeter of the planar member from a second side thereof to form an enclosed volume. The rim portion has a rim width approximately equal to a width of a sheet of drywall. The wiring device interface portion also includes a plurality of fastener apertures. A fastener storage structure includes a plurality of fastener storage holders extending in a direction substantially perpendicular to the first side of the planar member. The fastener storage holders and the planar member are configured to accommodate the structural member therebetween. Each fastener storage holder includes a fastener holder opening accessible from the second side. Each fastener storage holder is configured to secure a corresponding one of a plurality of fasteners within such that an end portion of a fastener disposed therein does not substantially extend into the volume. A wiring storage box includes a wall surface connected to the fastener storage structure at a first end and not connected to the fastener storage structure at a second end. The wiring storage box includes a sidewall extending contiguously from the rim portion and connected to the wall surface to form an interior wiring storage volume. The wiring storage box also has a wiring ingress portion.

In another aspect, the present invention is directed to an integrally formed ceiling mount for accommodating a ceiling mountable electrical device. The mount includes a wiring device interface portion including a substantially planar member configured to accommodate a structural member on a first side and a rim portion extending from a perimeter of the planar member on a second side thereof to form an enclosed volume. The rim portion has a rim width approximately equal to a width of a sheet of drywall. The wiring device interface portion includes a plurality of fastener apertures. A fastener storage structure includes a radial base portion connected to the planar member and a plurality of fastener storage holders extending from the base portion in a direction substantially normal to the first side of the planar member. The fastener storage holders and the planar member are configured to accommodate the structural member therebetween. Each fastener storage holder includes a fastener holder opening accessible from the second side. Each fastener storage holder is configured to secure a corresponding one of a plurality of fasteners within the fastener holder opening such that an end portion of a fastener disposed therein does not substantially extend into the volume. A wiring storage box includes a wall surface extending from the radial base portion and a sidewall extending contiguously from the rim portion and connected to the wall surface to form an interior wiring storage volume disposed adjacent to the fastener storage structure. The wiring storage box also has a wiring ingress portion.

In yet another aspect, the present invention is directed to an electrical wiring box including a wiring device interface portion having a substantially planar member configured to accommodate a structural member on a first side and a rim portion extending from a perimeter of the planar member from a second side thereof to form an enclosed volume. The rim portion has a rim width approximately equal to a width of a sheet of drywall. The wiring device interface portion includes a plurality of fastener apertures. A mounting stabilization structure extends in a direction substantially perpendicular to the first side of the planar member. The mounting stabilization structure and the planar member are configured to accommodate the structural member therebetween. A wiring storage box includes a wall surface connected to the mounting stabilization structure at a first end. The wiring storage box includes a sidewall extending contiguously from the rim portion and connected to the wall surface to form an interior wiring storage volume. The wiring storage box also has a wiring ingress portion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 7 is cross-sectional view of Section D-D shown in FIG. 5;

FIG. 8 is cross-sectional view of Section C-C shown in FIG. 5;

FIG. 9 is a perspective view of an underside portion of the ceiling box of a second embodiment of the present invention;

FIG. 10 is a perspective view of a top portion of the ceiling box shown in FIG. 9;

FIG. 11 is a perspective view of the fastener compartment of the ceiling box depicted in FIG. 9;

FIG. 12 is a side elevation of the ceiling box shown in FIG. 9;

FIG. 13 is a cross-sectional view of the fastener holder shown in FIG. 12;

FIG. 16 is a side elevation of the ceiling box shown in FIG. 14.

DETAILED DESCRIPTION

Figure 1:
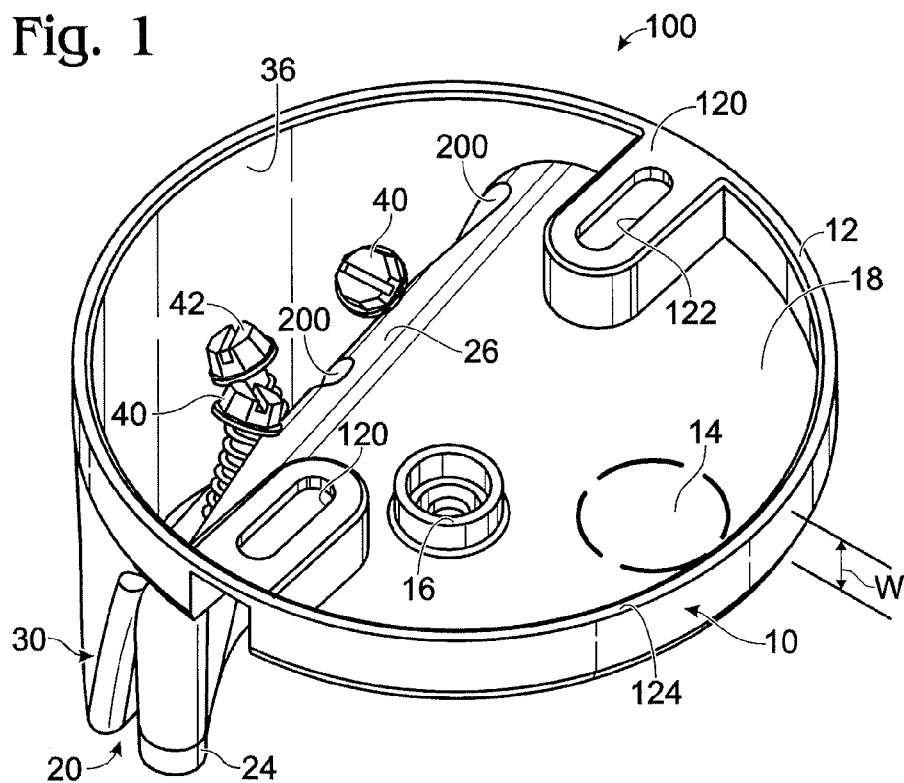
FIG. 1 is a perspective view of an underside portion of the ceiling box of a first embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the ceiling fan box of the present invention is shown in FIG. 1, and is designated generally throughout by reference numeral 100.

As embodied herein, and depicted in FIG. 1, a perspective view of an underside portion of the ceiling box 100 of a first embodiment of the present invention is disclosed. In general, it is noted that each of the proposed ceiling boxes is implemented as an integrally molded single piece that includes a semi-circular fan canopy interface 10, a fastener compartment portion 20, and a wiring compartment 30. It will be apparent to those of ordinary skill in the pertinent art that modifications and variations can be made to the single piece construction of the present invention depending on the strength and stability required in the application. For example, ceiling box 10 may be formed using any suitable tough and rigid plastic such as polycarbonate.

Referring to FIG. 1, semi-circular fan canopy interface 10 includes a rim member 12 that extends in a semicircle between two fan mounting interfaces 120. Rim member 12 supports a planar circular upper plate member 18 that may include a knockout 14 and an aperture stand-off 16 disposed therein. The knockout 14 may be used for feed-through wiring. The term feed-through refers to the practice of daisy-chaining electrical devices in the branch electrical circuit. Wiring devices typically include line terminals that are used to connect the device to the electrical wiring coming from the breaker panel. Feed through terminals are connected to the "feed through" wiring that extends from the feed through terminals to a subsequent downstream device. The knockout 14 may also be used as the sole ingress point for the wiring.

Two fan mounting interfaces 120 are disposed opposite to each other as an extension of rim member 12. Each fan mounting interface includes fastener apertures 122 that are coplanar with a lower edge 124 of the rim member 12. The fastener apertures 122 are, therefore, in a plane that is offset from the plane formed by upper plate member 18 by a distance equal to the width of rim member 12. The width ("W") of rim member 12 is approximately equal to the thickness of a sheet of ceiling drywall. Accordingly, the interior volume enclosed by rim member 12 and plate member 18 is not sufficiently large to safely store wiring or wiring connectors during installation. The lower edge 124 of rim 12 is, therefore, substantially flush with the drywall after installation.

FIG. 1 also shows a portion of the fastener compartment 20 interposed between fan canopy interface 10 and wiring compartment 30. The fastener compartment 20 includes fastener storage holes 200, which are formed in the exterior fastener holders 24 and the interior fastener holder 22 (See FIG. 2). The fastener storage holes 200 accommodate fasteners 40, 42 as shown. The fastener compartment 20 and the fastener storage holes 200, of course, separate the wiring storage area 30 from the mounting canopy 10. Accordingly, the placement of fasteners 40, 42 does not interfere with wiring installation. Because the fastener storage holes position the heads of fasteners 40, 42 well below the edge 124 of rim member 12, the fasteners 40, 42 do not interfere with the roto-zip tool during installation. In another embodiment, the heads of fasteners 40, 42 are positioned below the underside of planar upper plate member 18.

The fastener compartment 20 has a secondary purpose and may be thought of as mounting structure. In this view, each fastener holder functions as a structural stabilization member because it is disposed at a right angle with plate member 18. Together, the fastener holders and the plate member 18 form a stable pocket for a joist or other such structural member employed in the ceiling.

Figure 2:
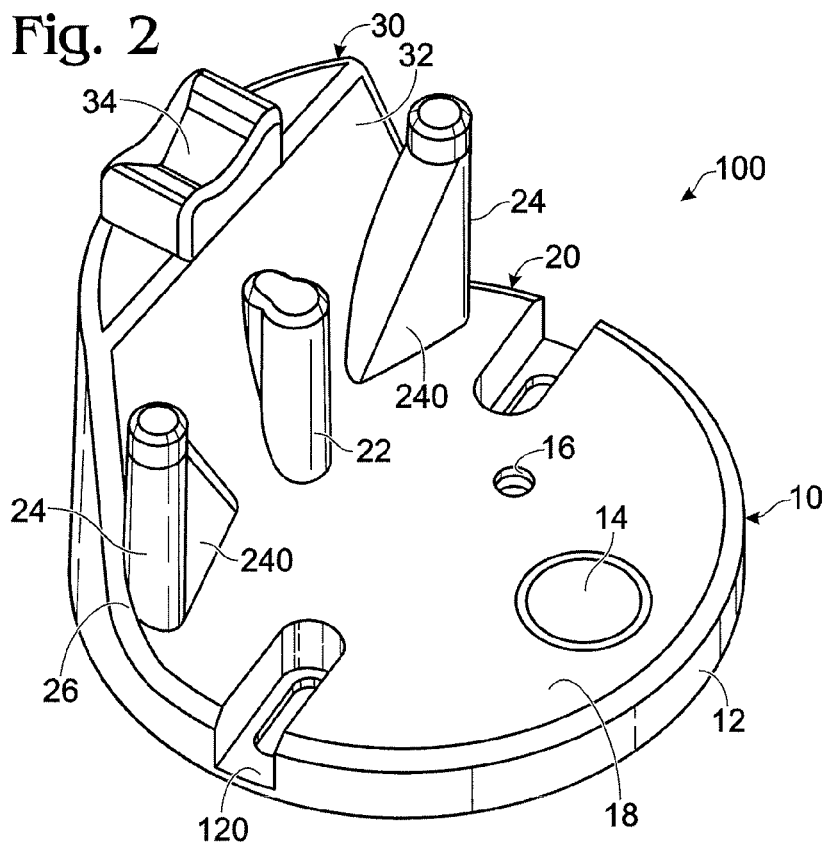
FIG. 2 is a perspective view of a top portion of the ceiling box shown in FIG. 1.

FIG. 2 is a perspective view of a top portion of the ceiling box depicted in FIG. 1. In this view, the exterior portion of fastener compartment 20 is clearly evident. In particular, fastener compartment 20 includes a curvilinear base portion 26 that extends between the planar upper plate member 18 and the sloping wall 32 of the wiring compartment 30. The fastener compartment 20 includes two outer fastener holders 24 and a centrally disposed inner fastener holder 22. The fastener holders (22, 24) extend vertically from curvilinear base portion 26. Each fastener holder is a hollow elongated structure that is sized to accommodate fastener lugs (40, 42), which are shown in FIG. 1. The outer holders 24 include a sloped wing portion 240, which allow the fastener to be rotated from a non-frictional insertion position to a secured friction-fit position within fastener holes 200. Each fastener holder may be characterized by a geometric form factor selected from a group of geometric form factors that include a square geometry, a rectangular geometry, a cylindrical geometry, oval geometry, or a polygonal geometry.

Reference is made to U.S. patent application Ser. No. 11/159,443 which is incorporated herein by reference as though fully set forth in its entirety, for a more detailed explanation of the fastener holder of the present invention.

The wiring compartment 30 includes a sloping wall 32 that extends between base portion 26 and auto-clamp portion 34. Wiring compartment 30 also includes a semi-circular back portion 38 that is more clearly seen in FIGS. 3-4. As those of ordinary skill in the art will appreciate, auto-clamp 34 allows an electrician to feed the electrical wiring from the ceiling box 100 exterior, through the opening in auto-clamp 34, and downward into the interior portion 36 of the wiring compartment. The auto-clamp 34 inhibits any movement of the wiring in the opposite direction.

Figure 3:
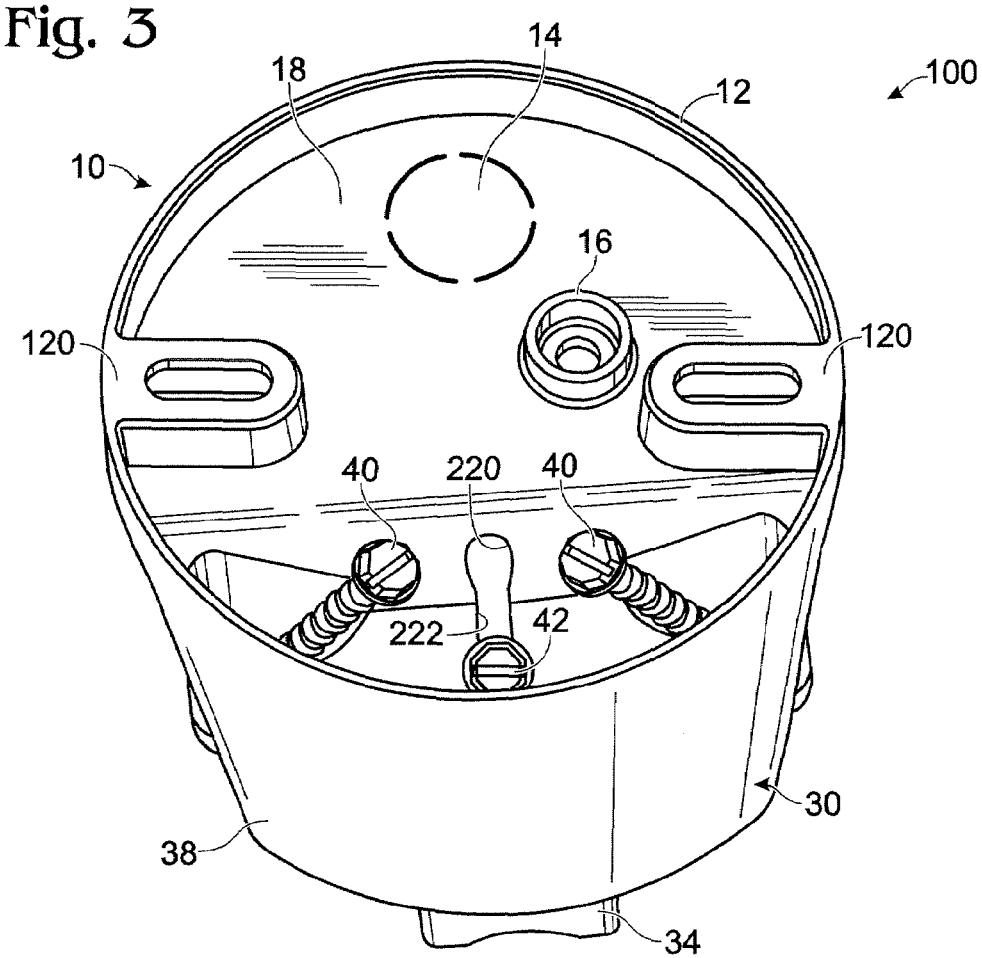
FIG. 3 is a perspective view of the fastener compartment of the ceiling box depicted in FIG. 1.

Referring to FIG. 3, a perspective view of the underside of ceiling box 100 is shown from another vantage point. The interior of each fastener holder (22, 24) is accessed from the underside of ceiling box 100 by an insertion slot 200, each slot including a fastener insertion position 220 and a fastener retaining position 222. Comparing the view shown in FIG. 1 with the view provided in FIG. 3, it is clearly seen that curvilinear base portion 26 provides a radial surface that allows the fastener lugs (40, 42) to rotate from the insertion position 220 to the secured position 222. In the retaining position, the fasteners 40, 42 are inclined forward to the fan canopy 10 by generally following the incline of radial surface 26. In other words, curvilinear base portion 26 provides an interior volume, between the fan canopy interface 10 and the wiring compartment 30, that is configured to accommodate the heads of the fastener lugs (40, 42) during the installation. Accordingly, the movement of the electrical wiring through auto-clamp 34 is not impeded by the fasteners 40, 42 and are effectively out of the way when the electrical wiring and wiring connections are housed in the interior portion 36 of the wiring compartment 30 after fixture installation. In similar fashion, the fasteners 40, 42 are disposed away from the blade of the roto-zip tool. The radial surface 26 also provides the user's fingers with the necessary maneuvering room to effect the removal of the lugs (40, 42).

Figure 4:
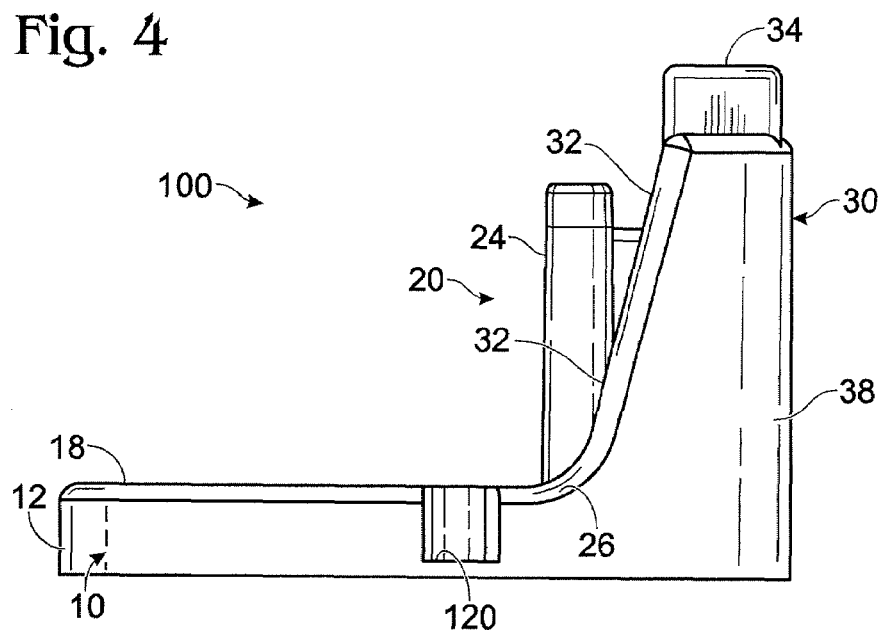
FIG. 4 is a side elevation of the ceiling box shown in FIG. 1.

FIG. 4 is a side elevation of the ceiling box shown in FIG. 1. From this vantage point, it is clearly seen that the sloping wall 32 of wiring compartment 30 and the planar upper surface of plate member 18 of fan canopy interface 10 form an obtuse angle. The fastener holders (22, 24) disposed between the canopy interface 10 and wiring compartment 30 have a circular cross-section and are substantially normal to the upper plate member 18. Accordingly, the right angle formed by plate member 18 and the fastener holders is configured to accommodate a ceiling joist therebetween when the ceiling box is installed.

Again, the wiring compartment 30 includes a sloping wall 32 that extends between base portion 26 and auto-clamp portion 34. Wiring compartment 30 also includes a semi-circular back portion 38. The auto-clamp 34 allows an electrician to feed the electrical wiring downward into the interior portion 36 of the wiring compartment. The auto-clamp 34 inhibits any movement of the wiring in the opposite direction. Electrical wiring and wiring connections are housed in the interior portion 36 of the wiring compartment 30 after fixture installation.

Figure 5:
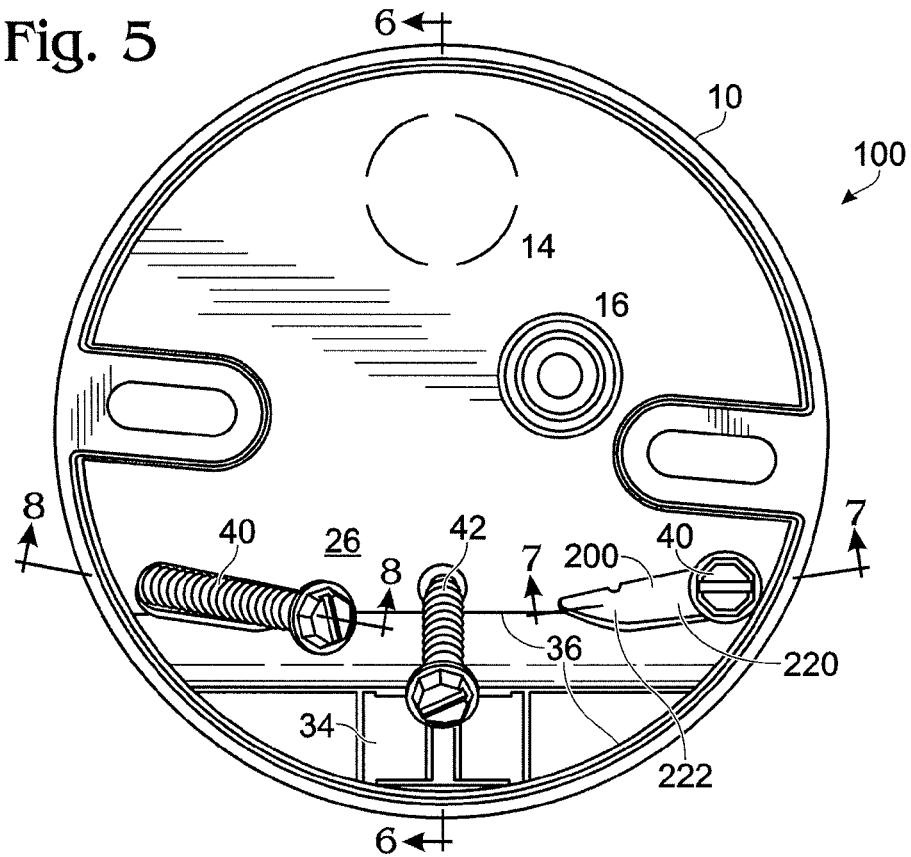
FIG. 5 is bottom plan view of the ceiling box depicted in FIG. 1.

Referring to FIG. 5, a bottom plan view of the ceiling box depicted in FIG. 1 is shown. In this view, the position of the fasteners are variously shown in the insertion and secure positions. For example, in Section C-C (FIG. 8), fastener 40 is inserted and secured within insertion slot 200. In Section D-D (FIG. 7), fastener 40 is inserted into slot 200, but not secured. In Section E-E (FIG. 6), fastener 42 is shown in the secured position within slot 220. Note that the fastener 42 will not impede the movement of the wiring during the routing of wiring through wire-clamp 34 because it will have been removed and used to mount the fan canopy 10 to the joist. In other words, the ceiling box is typically mounted before the electrician routes the wiring.

Figure 6:
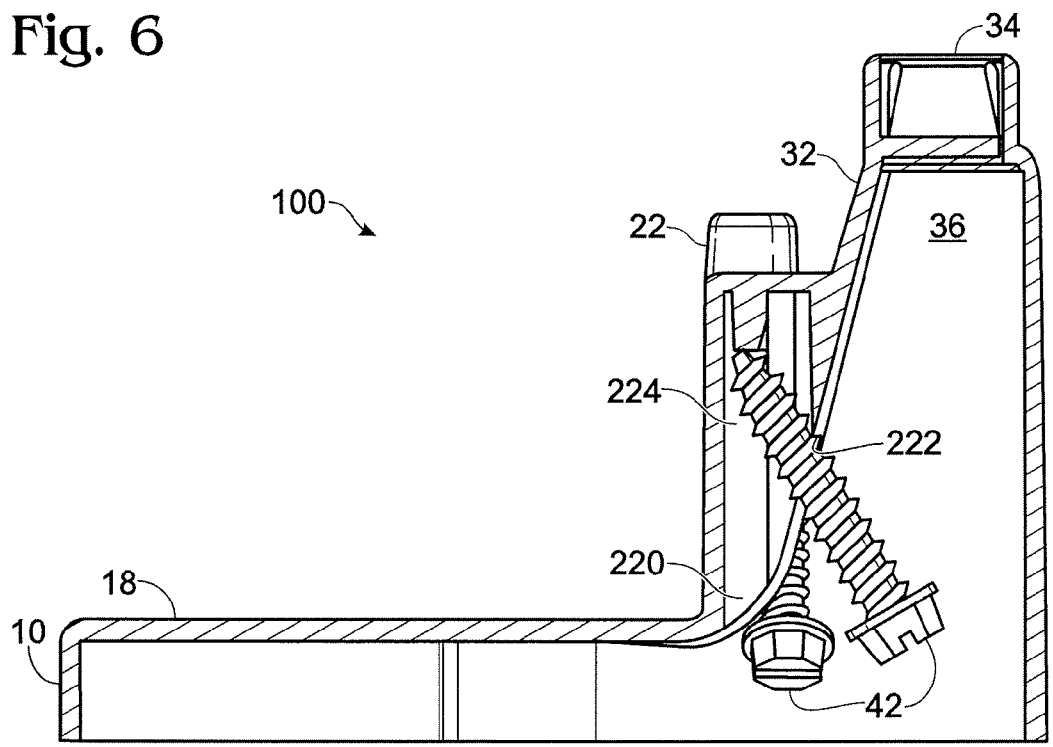
FIG. 6 is cross-sectional view of Section E-E shown in FIG. 5.

FIG. 6 is cross-sectional view of Section E-E shown in FIG. 5. The cross-section is taken through the middle of the ceiling box. Fastener 42 is inserted into the holder interior 224 in the insertion position 220 of slot 200. Fastener 42 is rotated into the secure position 222 of slot 200. In the secure position 222, the width of slot 200 is narrowed significantly, such that the threads of fastener 42 are held in place by the sides of slot 200 by fiction fit.

FIG. 7 is cross-sectional view of Section D-D shown in FIG. 5. In this view, fastener 40 is inserted into holder interior 224 by way of the insertion position 220 of slot 200. Fastener 40 is secured by rotating it in the direction of the arrow. Again, in the secure position 222, the width of slot 200 is narrowed significantly, such that the threads of fastener 40 are held in place by the sides of slot 200 by fiction fit. FIG. 8 is cross-sectional view of Section C-C shown in FIG. 5. This view shows fastener 40 in the secure position 222.

As embodied herein, and depicted in FIG. 9, a perspective view of an underside portion of the ceiling box of a second embodiment of the present invention is disclosed. The second embodiment is very similar to the first embodiment, the difference being the construction of the fastener holders (22, 24). In the second and third embodiments of the present invention, the fastener holders 22, 24 are formed such that the head of the fastener lugs (40, 42) are disposed slightly below the interior surface of plate member 18 when fully inserted. The bore hole of the fastener holders is tapered such that the end portion of each fastener lug is retained by the narrowed interior surface of the holder.

Referring to FIG. 10, a perspective view of a top portion of the ceiling box shown in FIG. 9 is disclosed. Note that the fastener holders 22, 24 in this embodiment do not include the wing portions 240 that are employed in the first embodiment described above. The wing portions, of course, are not needed because of the tapered nature of the interior of the fastener holders.

FIG. 11 is a perspective view of the fastener compartment of the ceiling box depicted in FIG. 9. As described above, when fully inserted, the heads of the fastener lugs (40, 42) are disposed in the sloping surface 26, slightly below the interior surface of plate member 18. In an alternate embodiment, the bore hole may include a retaining edge 226 that is configured to retain the head of the lugs (40, 42).

FIG. 12 is a side elevation of the ceiling box shown in FIG. 9. The only difference between this view and the one depicted in FIG. 4 is the absence of the wing portions 240.

FIG. 13 is a cross-sectional view of the fastener holder shown in FIG. 12. As noted previously, the interior 224 of the fastener holders 22, 24 is tapered. Each fastener 40, 42 is inserted into retaining opening 200 until the taper prevents the fastener from being inserted any further. The threads of fastener 42 are held in place by the sides of slot 200 by fiction fit. If hole 200 includes a retaining edge 226, the fastener will be inserted until the head snaps in place under the edge 226.

Figure 14:
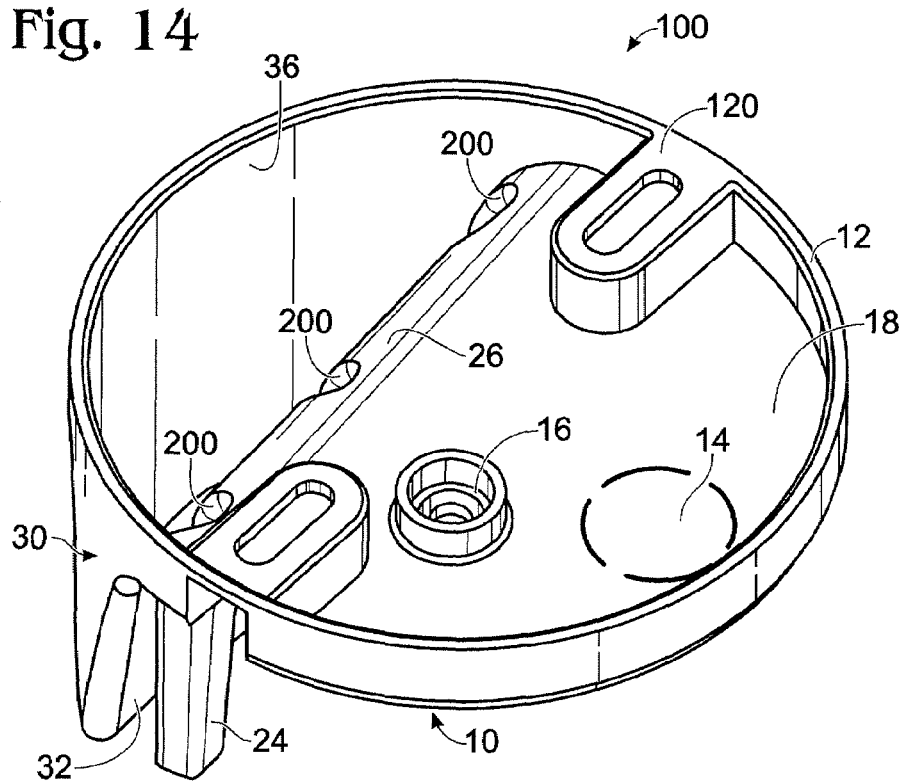
FIG. 14 is a perspective view of an underside portion of the ceiling box of a third embodiment of the present invention.

As embodied herein, and depicted in FIG. 14, a perspective view of an underside portion of the ceiling box in accordance with a third embodiment of the present invention is disclosed. The third embodiment is also very similar to the first and second embodiments. Accordingly, a description of like elements will not be repeated for sake of brevity. One difference between the first and third embodiments relates to the construction of the fastener holders (22, 24). Like the second embodiment, the fastener holders in the third embodiment are formed such that the head of the fastener lugs (40, 42) are disposed slightly below the interior surface of plate member 18 when fully inserted. The bore hole of the fastener holders are tapered such that the end portion of each fastener lug is retained by the narrowed interior surface of the holder. Again, the bore hole 200 may include a retaining edge 226 that is configured to retain the head of the lugs (40, 42).

Figure 15:
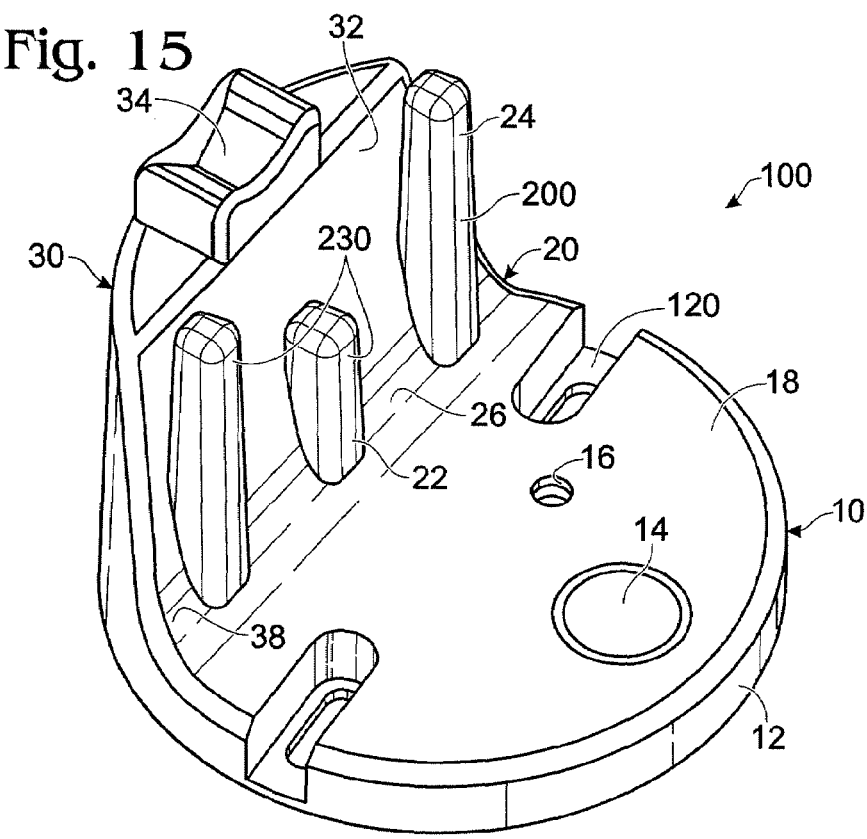
FIG. 15 is a perspective view of an top portion of the ceiling box shown in FIG. 14.

FIG. 15 is a perspective view of a top portion of the ceiling box shown in FIG. 14. The major difference between the second and third embodiments relates to the shape of fastener holders 22, 24, i.e., the third embodiment employs fastener holders (22, 24) that have a square, rectangular or octagonal cross-section. FIG. 16 is a side elevation of the ceiling box shown in FIG. 14. This view illustrates the utility of the square, rectangular or octagonal cross-section. The flat side 230 provides relatively more surface area when the ceiling box 100 abuts the joist.

A method for installing each of the three embodiments described herein is provided below. Note that each embodiment is provided with two mounting fastener lugs 40 and a shorter center lug 42 disposed in the fastener holders (22, 24). After the rough-in phase of construction, for example, the center fastener lug 42 is inserted into aperture stand-off 16 to mount the ceiling box to the underside of the joist. Subsequently, the electrical wiring is inserted through auto-clamp 34 and stored in the interior portion 36 of the wiring compartment 30 during installation. In conventional designs, the fastener lugs are often disposed in the electrical lead box and interfere with the electrical wires when they are being pulled through the wire opening (such as an auto-clamp). The proposed designs eliminate this problem by providing an intermediate fastener compartment 20. In any event, after the wiring is stored in compartment 30, a tradesperson places sheetrock over the partially installed ceiling box. After sheetrock installation is completed, a tradesperson uses a roto-zip tool to cut away the portion of the sheet rock that is covering the ceiling box. Because the fastener lugs (40, 42) are safely disposed in the fastener holders (22, 24), and because the wiring is safely stored in the wiring compartment 30, it is highly unlikely that the roto-zip tool will strike either the lugs or the electrical wiring during the ceiling box cut-out phase. Installation continues after the dry-wall is finished and painted, by mounting the ceiling fan/light fixture to the joist and ceiling box using fastener lugs 40. The fastener lugs 40 are removed from the fastener holders, inserted into the fixture bracket of the fan and through slots in fan mounting interfaces 120, and tightened until the ceiling fan/light fixture is snugly mounted to fan canopy interface 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring box comprising:
a wiring device interface portion including a substantially planar member configured to accommodate a structural member on a first side and a rim portion extending from a perimeter of the planar member from a second side thereof to form an enclosed volume, the rim portion having a rim width approximately equal to a width of a sheet of drywall, the wiring device interface portion including a plurality of fastener apertures;
a fastener storage structure including a plurality of fastener storage holders extending in a direction substantially perpendicular to the first side of the planar member, the fastener storage holders and the planar member being configured to accommodate the structural member therebetween, each fastener storage holder including a fastener holder opening accessible from the second side, each fastener storage holder being configured to secure a corresponding one of a plurality of fasteners within such that an end portion of a fastener disposed therein does not substantially extend into the volume; and
a wiring storage box including a wall surface connected to the fastener storage structure at a first end and not connected to the fastener storage structure at a second end, the wiring storage box including a sidewall extending contiguously from the rim portion and connected to the wall surface to form an interior wiring storage volume, the wiring storage box also having a wiring ingress portion.

2. The box of claim 1, wherein the wiring device interface portion, the fastener storage structure, and the wiring storage box are integrally formed.

3. The box of claim 1, wherein the plurality of fastener apertures includes a central aperture stand-off disposed in a central portion of the planar member extending from the second side a distance substantially equal to the rim width, the central aperture stand-off being configured to accommodate a fastener for connecting the box to the structural member.

4. The box of claim 1, the plurality of fastener apertures includes a plurality of wiring device fastener apertures formed within the rim portion at the perimeter.

5. The box of claim 4, wherein each wiring device fastener aperture including a wall portion contiguous with the rim portion and having a height substantially equal to the rim width, each wiring device fastener aperture including an aperture floor substantially coplanar with an edge of the rim portion, the aperture floor having a fastener aperture slot formed therein.

6. The box of claim 1, wherein the rim portion and the sidewall form a substantially circular shape.

7. The box of claim 1, wherein the wiring device interface portion is configured as a fan canopy interface or a lighting fixture interface.

8. The box of claim 1, wherein the wiring ingress portion includes an auto-clamp.

9. The box of claim 1, wherein the plurality of fastener storage holders are disposed in a line such that a portion of each of the plurality of fastener storage holders simultaneously abuts a substantially flat face of the structural member when the box is connected to the structural member.

10. The box of claim 9, wherein each of the plurality of fastener holders is characterized by a geometric form factor selected from a group of geometric form factors that include a square geometry, a rectangular geometry, a cylindrical geometry, oval geometry, or a polygonal geometry.

11. The device of claim 10, wherein each of the plurality of fastener holders includes a substantially cylindrical bore hole, the bore hole being configured to accommodate a fastener.

12. The device of claim 10, wherein each of the plurality of fastener holders includes a tapered bore hole, the bore hole being configured to secure a fastener therein by friction fit.

13. The box of claim 1, wherein each of the plurality of fastener holders is characterized by a geometric form factor selected from a group of geometric form factors that include a square geometry, a rectangular geometry, a cylindrical geometry, oval geometry, or a polygonal geometry.

14. The device of claim 1, wherein each of the plurality of fastener holders includes a tapered bore hole, the tapered bore hole being configured to secure a fastener therein by friction fit.

15. The box of claim 1, wherein the fastener holder opening includes a non-friction fastener insertion position and a friction fit fastener retaining position.

16. The box of claim 15, wherein the non-friction fastener insertion position comprises a relatively wide portion of the fastener holder opening and the friction fit fastener retaining position comprises a relatively narrow portion of the fastener holder opening.

17. The box of claim 16, wherein a first end portion of a fastener is disposed within the fastener holder at a bottom portion thereof and a second end of the fastener is exposed within the fastener holder opening at the non-friction fastener insertion position, the second end of the fastener being rotated length-wise from the non-friction fastener insertion position to the friction fit fastener retaining position.

18. The box of claim 1, wherein an interior bore hole of each of the plurality of fastener holders is a tapered bore hole such that the fastener holder opening is relatively wider than a bottom interior portion of the fastener holder.

19. The box of claim 18, further comprising a retaining edge disposed around the fastener holder opening.

20. The box of claim 19, wherein a fastener head of the fastener in configured to fit under the retaining edge in a secured state.

21. The box of claim 1, wherein the fastener storage structure includes a radial base portion connected between the substantially planar member and the wall surface, the plurality of fastener storage holders extending from the base portion.

22. An integrally formed ceiling mount for accommodating a ceiling mountable electrical device, the mount comprising:
- a wiring device interface portion including a substantially planar member configured to accommodate a structural member on a first side and a rim portion extending from a perimeter of the planar member on a second side thereof to form an enclosed volume, the rim portion having a rim width approximately equal to a width of a sheet of drywall, the wiring device interface portion including a plurality of fastener apertures;
- a fastener storage structure including a radial base portion connected to the planar member and a plurality of fastener storage holders extending from the base portion in a direction substantially normal to the first side of the planar member, the fastener storage holders and the planar member being configured to accommodate the structural member therebetween, each fastener storage holder including a fastener holder opening accessible from the second side, each fastener storage holder being configured to secure a corresponding one of a plurality of fasteners within the fastener holder opening such that an end portion of a fastener disposed therein does not substantially extend into the volume; and
- a wiring storage box including a wall surface extending from the radial base portion and a sidewall extending contiguously from the rim portion and connected to the wall surface to form an interior wiring storage volume disposed adjacent to the fastener storage structure, the wiring storage box also having a wiring ingress portion.

23. The mount of claim 22, wherein the radial base portion is substantially continuously disposed between the second side of the planar member and an interior surface of the wall surface.

24. An electrical wiring box comprising:
- a wiring device interface portion including a substantially planar member configured to accommodate a structural member on a first side and a rim portion extending from a perimeter of the planar member from a second side thereof to form an enclosed volume, the rim portion having a rim width approximately equal to a width of a sheet of drywall, the wiring device interface portion including a plurality of fastener apertures;
- a mounting stabilization structure extending in a direction substantially perpendicular to the first side of the planar member, the mounting stabilization structure and the planar member being configured to accommodate the structural member therebetween; and
- a wiring storage box including a wall surface connected to the mounting stabilization structure at a first end, the wiring storage box including a sidewall extending contiguously from the rim portion and connected to the wall surface to form an interior wiring storage volume, the wiring storage box also having a wiring ingress portion.

25. The box of claim 24, wherein the mounting stabilization structure includes a plurality of fastener storage holders, each fastener storage holder including a fastener holder opening accessible from the second side, each fastener storage holder being configured to secure a corresponding one of a plurality of fasteners within such that an end portion of a fastener disposed therein does not substantially extend into the volume.

\* \* \* \* \*